US010927824B2

(12) United States Patent
Winkler et al.

(10) Patent No.: US 10,927,824 B2
(45) Date of Patent: Feb. 23, 2021

(54) MECHANICAL MOVEMENT WITH ROTARY RESONATOR, WHICH IS ISOCHRONOUS AND POSITIONALLY INSENSITIVE

(71) Applicant: ETA SA Manufacture Horlogere Suisse, Grenchen (CH)

(72) Inventors: Pascal Winkler, St-Blaise (CH); Jean-Luc Helfer, Le Landeron (CH); Gianni Di Domenico, Neuchatel (CH); Yves-Alain Cosandier, Renens (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 319 days.

(21) Appl. No.: 16/039,828

(22) Filed: Jul. 19, 2018

(65) Prior Publication Data

US 2019/0032644 A1 Jan. 31, 2019

(30) Foreign Application Priority Data

Jul. 26, 2017 (EP) .................................... 17183211

(51) Int. Cl.
*G04B 17/30* (2006.01)
*F03G 7/08* (2006.01)
*G04B 17/04* (2006.01)

(52) U.S. Cl.
CPC ............... *F03G 7/08* (2013.01); *G04B 17/30* (2013.01); *G04B 17/045* (2013.01)

(58) Field of Classification Search
CPC ......... F03G 7/08; G04B 17/30; G04B 17/045; G04B 17/00; G04B 21/06; G04B 17/04;
(Continued)

(56) References Cited

U.S. PATENT DOCUMENTS 1,595,169 A 8/1926 Schieferstein
3,316,708 A * 5/1967 Waldburger ........... G04C 3/102 368/168

(Continued)

FOREIGN PATENT DOCUMENTS

CH 293180 9/1953
FR 630.831 12/1927

OTHER PUBLICATIONS

European Search Report dated Mar. 12, 2018 in European Application 17183211.6, filed on Jul. 26, 2017 (with English Translation of Categories of cited documents).

*Primary Examiner* — Edwin A. Leon
(74) *Attorney, Agent, or Firm* — Oblon, McClelland, Maier & Neustadt, L.L.P.

(57) ABSTRACT

A mechanical horological movement includes at least one energy storage to drive a gear train of which an output mobile component pivots about a drive axis and including a rotary resonator which has at least one central mobile component to pivot about a central axis and including an input mobile component to collaborate with the output mobile component, this rotary resonator includes a plurality of inertial elements that each pivot with respect to the central mobile component about a secondary axis perpendicular to the central axis and each returned towards a rest position, relative with respect to the central mobile component, by at least one elastic return element, and each secondary axis passes through the centre of mass of the inertial element associated with it.

24 Claims, 3 Drawing Sheets

(58) Field of Classification Search
CPC ........ G04B 17/32; G04B 17/06; G04B 17/20; G04B 17/22; Y10T 74/18056
USPC .......................................................... 368/168
See application file for complete search history.

(56) References Cited

U.S. PATENT DOCUMENTS

| | | | | |
|---|---|---|---|---|
| 9,465,363 | B2 * | 10/2016 | Winkler | G04B 17/08 |
| 10,126,711 | B2 * | 11/2018 | Winkler | G04B 17/30 |
| 2015/0185700 | A1 * | 7/2015 | Kawauchiya | G04B 17/063 368/127 |
| 2017/0123380 | A1 * | 5/2017 | Winkler | G04B 17/066 |

* cited by examiner

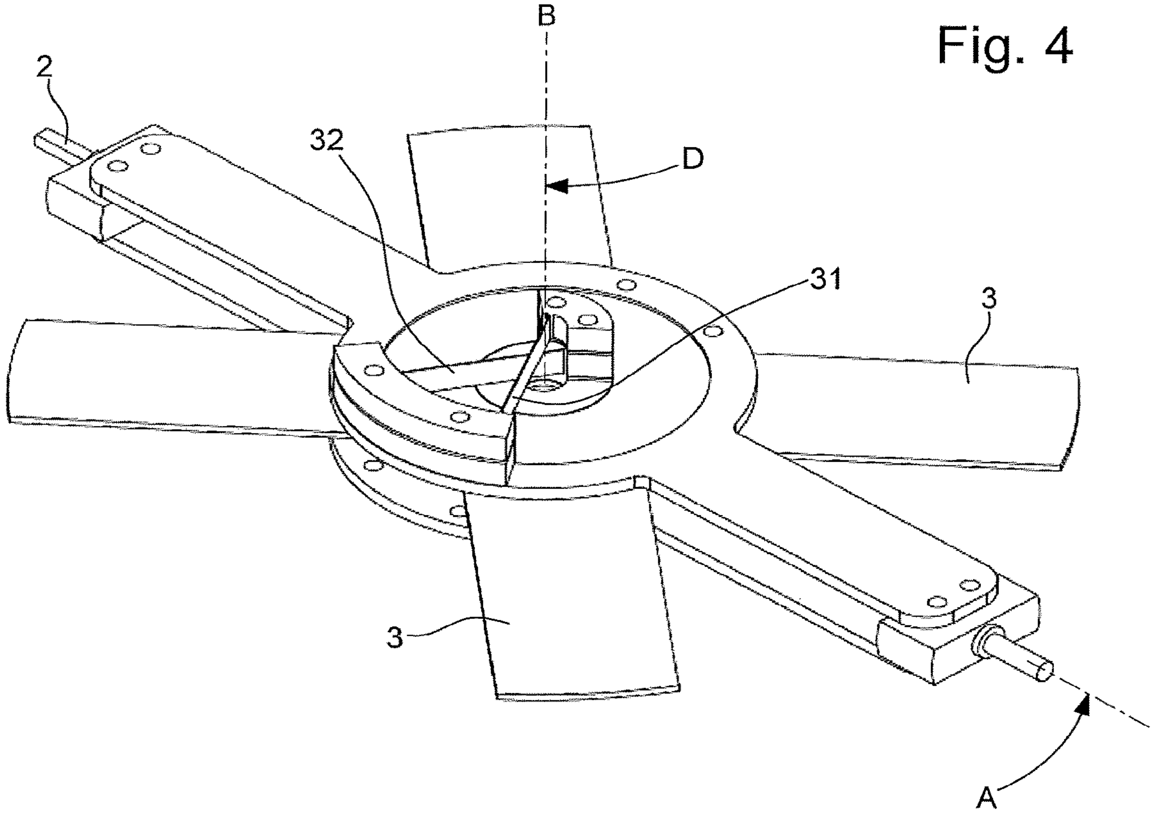
Fig. 4
Fig. 5
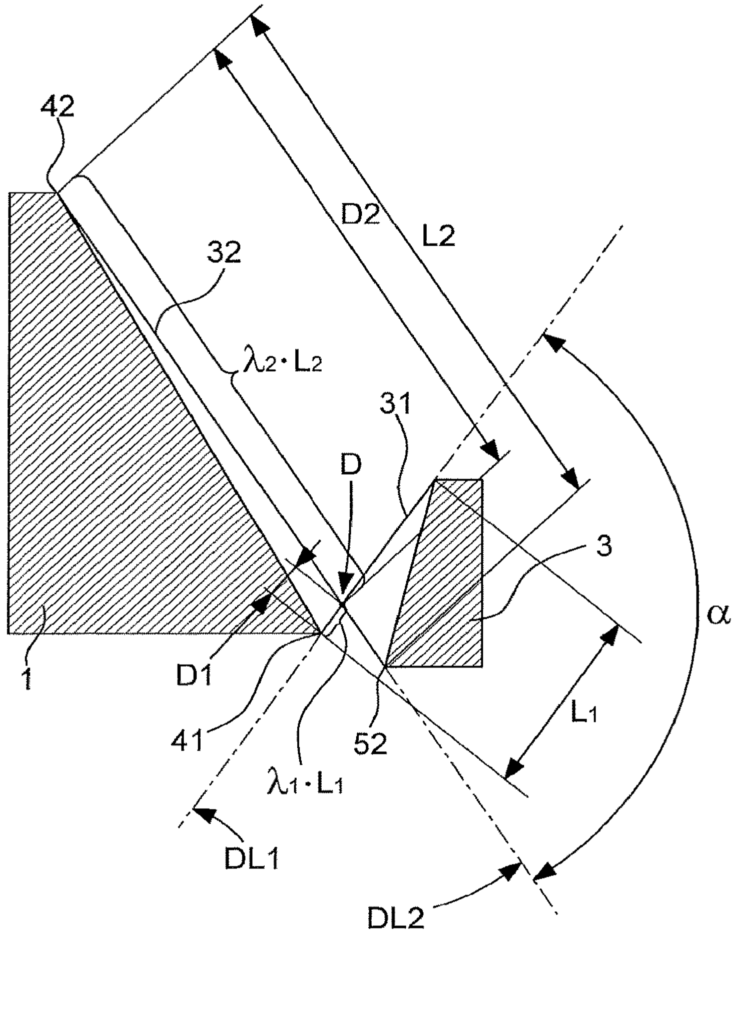

MECHANICAL MOVEMENT WITH ROTARY RESONATOR, WHICH IS ISOCHRONOUS AND POSITIONALLY INSENSITIVE

This application claims priority from European patent application No. 17183211.6 filed on Jul. 26, 2017, the entire disclosure of which is hereby incorporated herein by reference

FIELD OF THE INVENTION

The invention relates to a mechanical horological movement comprising at least one energy storage means designed to drive a gear train of which an output mobile component is designed to pivot about a drive axis and comprising a rotary resonator which comprises at least one central mobile component designed to pivot about a central axis and comprising an input mobile component designed to collaborate with the output mobile component.

The invention also relates to a watch comprising such a movement.

The invention relates to the field of time bases for mechanical horological movements.

BACKGROUND OF THE INVENTION

Most present-day mechanical watches are equipped with a hair spring-balance and with a Swiss lever escapement. The hair spring-balance constitutes the time base of the watch. It is also referred to as the resonator. The escapement, for its part, performs two key functions:

sustaining the to-and-fro cycles of the resonator;

counting these cycles.

In addition to performing these two main functions, the escapement needs to be robust, resistant to shocks, avoid jamming the movement (overbanking) and not lose its setting over the course of time.

A Swiss lever escapement, which is the one most generally used, has a low energy efficiency of the order of 30%. This low efficiency stems from the fact that the movements of the escapement are jerky, that there are wasted paths or falls that are needed in order to accommodate spread in the machining operations, and also from the fact that several components transmit their movement via inclined planes which rub against one another.

SUMMARY OF THE INVENTION

It is an objective of the present invention to eliminate the jerkiness of the escapement in order to increase the efficiency thereof. In order to reach this objective, there is proposed a rotary resonator notably characterized by the possibility of sustaining rotation using a torque applied directly to the axis of the resonator, thus avoiding the dynamic losses of a conventional lever escapement.

Historically, watchmakers have not considered rotary resonators as time bases for watches because rotary resonators are not generally isochronous, and what is more they are sensitive to gravity, and therefore to the position of the watch in the gravitation field.

A mechanism such as the Watt regulator may constitute a basis for a rotary resonator, but with modifications to make it isochronous and insensitive to gravity. Specifically, a Watt regulator is sensitive to its orientation in the gravitation field, because the overall centre of mass of the two flyweights shifts as the amplitude changes: the flyweights rise up along the axis when the amplitude increases. As a result, the contribution made by gravity to the return force fluctuates with orientation. What is more, a Watt regulator is anisochronous because the return force of the flyweights, using a spring and/or using gravity does not meet certain conditions.

The invention therefore sets itself the task of meeting the conditions that make it possible to have a rotary resonator that can be used as a time base in a horology instrument:

the condition of isochronism: existence of elastic (or elastic potential) return forces imposing on the centre of mass of each half-arm a central force of intensity proportional to the distance between the axis of rotation and the centre of mass of the half-arm;

condition of positional insensitivity: use of at least two half-arms which are guided, so that their centre of mass can be moved away from the axis of rotation, while at the same time keeping the overall centre of mass of the resonator in a fixed position;

condition of nil reaction forces in the support: use of arms distributed symmetrically about the axis so as to cancel out the reactions in the pivots at all amplitudes.

To this end, the invention relates to a mechanical horology movement according to claim 1.

The invention also relates to a watch comprising such a movement.

BRIEF DESCRIPTION OF THE DRAWINGS

Further features and advantages of the invention will become apparent from reading the detailed description which follows, with reference to the attached drawings in which:

FIG. 4 is an alternative form in which the elastic return means consist of intersecting-blade flexible guides, each flexible guide comprising two levels and one blade per level, these two blades intersecting in projection onto a plane parallel to that of the levels;

FIG. 5 is a view in planar projection of a first arrangement comprising two such asymmetric intersecting blades in a particular arrangement designed to create a return torque that is proportional to the sine of twice the angle of pivoting;

DETAILED DESCRIPTION OF THE PREFERRED EMBODIMENTS

Application EP16195399 by the same applicant relates to a resonator mechanism for a horology movement, comprising an input mobile component mounted to pivot about an axis of rotation and subjected to a drive torque and comprising a central mobile component, rotating as one with this input mobile component about the axis of rotation and designed to turn continuously. This resonator mechanism comprises a plurality of N inertial elements, each one able to move in at least one degree of freedom with respect to the central mobile component, and returned towards the axis of rotation by elastic return means which are designed to impose a return force on the centre of mass of the inertial element. This resonator mechanism has rotational symmetry of order N. This resonator mechanism comprises means of dynamic connection between all the inertial elements, and which are designed to keep all the centres of mass of the inertial elements at the same distance from the axis of rotation at all times, and elastic return means imposing an elastic potential, characterized by a particular relationship. More particularly, this resonator mechanism has a pantograph-type structure.

The issue here is that of improving such a mechanism. Specifically, the drive torque and the aerodynamic resistance torque generate a radial force which combines with the elastic potential and disrupts the isochronism.

Figure 1:
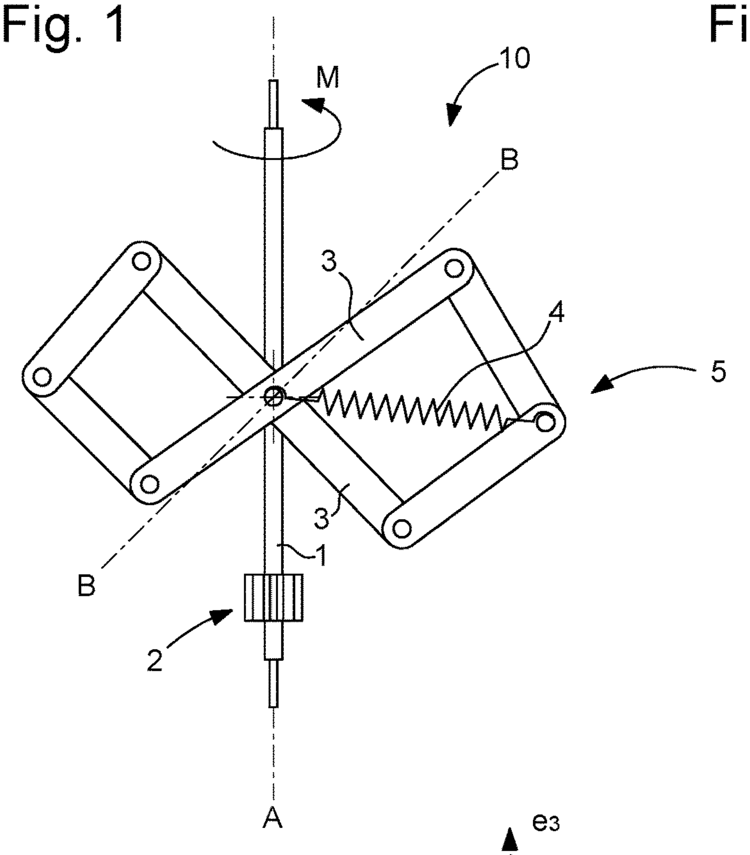
FIG. 1 is a schematic and perspective depiction of a first alternative form of resonator mechanism according to the invention, produced on the basis of the pantograph resonator mechanism according to Application EP16195399 by the same Applicant, but in which the pivoting of the inertial elements takes place orthogonally to the pivoting of the drive.

The present invention proposes orienting the pivoting of the inertial elements differently so as not to disrupt the isochronism by the drive or by tangential aerodynamic forces. FIG. 1 illustrates an alternative form of resonator mechanism according to the invention, in which the pivoting of the inertial elements takes place orthogonally to the pivoting of the drive.

Figure 2:
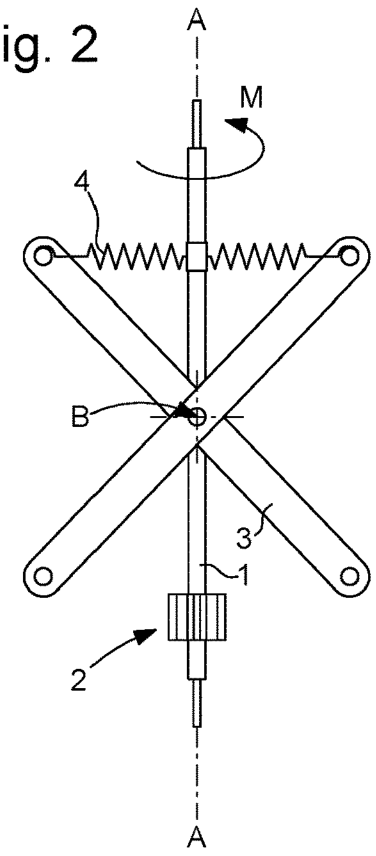
FIG. 2, in a way similar to FIG. 1, depicts another alternative form of resonator mechanism according to the invention, simplified by the omission of the articulated dynamic links.

FIG. 2 shows that the complex articulated linkage of the mechanism of FIG. 1, which stems directly from application EP16195399, can disappear yielding the benefit of a very simple structure: the present invention has the advantage of combining the drive mobile component and the resonator into a single entity that is very simple to produce.

This mechanism avoids the shocks and friction inherent in poorly tuned slotted or rod-crank drive mechanisms.

The invention avoids the needless proliferation of elastic elements between the plate and the inertial element on the one hand, and between the drive mobile component and the inertial element on the other.

Thus, the invention relates to a mechanical horological movement 100 comprising at least one energy storage means 200, such as a barrel or the like, designed to drive a gear train 300 of which an output mobile component is designed to pivot about a drive axis.

This movement 100 comprises a rotary resonator 10 which comprises at least one central mobile component 1 designed to pivot about a central axis A.

More particularly, this central axis A is parallel or perpendicular to the drive axis.

The central mobile component 1 comprises an input mobile component 2 which is designed to collaborate with the output mobile component.

According to the invention, the rotary resonator 10 comprises at least one inertial element 3 designed to pivot with respect to the central mobile component 1 about a secondary axis B perpendicular to the central axis A and secant therewith, and returned towards a rest position, relative with respect to the central mobile component 1, by at least one elastic return element 4, and this secondary axis B passes through the centre of mass of the inertial element 3 associated with it.

More particularly, the rotary resonator 10 comprises a plurality of inertial elements 3 each one designed to pivot with respect to the central mobile component 1 about a secondary axis B perpendicular to the central axis A and secant therewith, and each one returned towards a rest position, relative with respect to the central mobile component 1, by at least one elastic return element 4.

Further, each secondary axis B passes through the centre of mass of the inertial element 3 associated with it.

More particularly, this at least one elastic return element 4 is designed to apply to the respective inertial element 3 a torque with an elastic return moment, according to the relationship:

$$M(\theta_1)=\tfrac{1}{2}\cdot\omega_3^2\cdot(I_2-I_3)\cdot\sin(2\theta_1),$$

where $\theta_1$ is the angle of inclination of the inertial element 3 with respect to its said rest position which is its position of equilibrium when stationary, where $\omega_3$ is the angular velocity of the central mobile component 1, which is therefore the pulse repeat frequency of the resonator, where $I_2$ is the inertia of the inertial element 3 with respect to a transverse axis E perpendicular both to the central axis A and to the said secondary axis B and where $I_3$ is the inertia of the inertial element 3 with respect to the central axis A.

More particularly, this rotary resonator 10 exhibits, in a rest position, rotational symmetry about the central axis A of order N, where N is an integer, greater than or equal to 2.

More particularly, the said inertia elements 3 that the rotary resonator 10 comprises have, in a rest position, rotational symmetry about the central axis A of order N, where N is an integer, greater than or equal to 2.

More particularly still, each inertial element 3 exhibits rotational symmetry of order 2 about its secondary axis B.

In an alternative form, at least one elastic return element 4 is fixed at a first end to the central mobile component 1 and at a second end to the inertial element 3.

In another alternative form, which may naturally be combined with the previous one, at least one elastic return element 4 is fixed at a first end to one inertial element 3 and at a second end to another inertial element 3.

Figure 3:
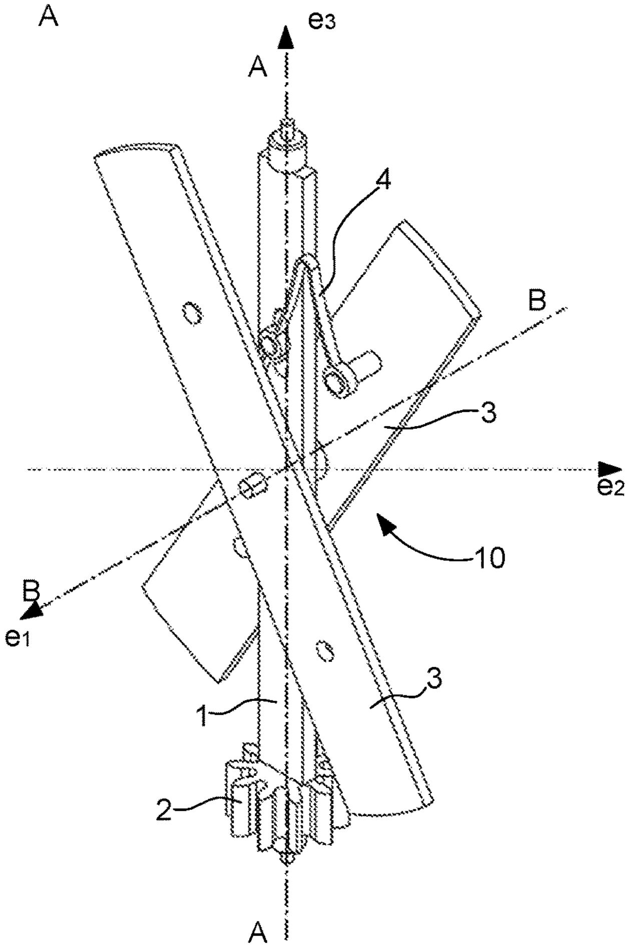
FIG. 3 depicts details of a rotary resonator mechanism, similar to that of FIG. 2, comprising a central mobile component designed to pivot about a central axis, and with respect to which two flatted inertial elements, returned towards the central mobile component by elastic return means here consisting of fine-blade elastic vees, are able to move about an orthogonal axis.

In yet another alternative form, visible particularly in FIGS. 3 and 4, each elastic return element 4 is fixed at a first end to the central mobile component 1 and at a second end to the inertial element 3.

More particularly, and as visible in the nonlimiting embodiments illustrated, all the inertial elements 3 of one and the same rotary resonator 10 are designed to pivot about a common secondary axis B.

In particular alternative forms visible particularly in FIGS. 3 and 4, at least one said inertial element 3 is at least 5 times as long as it is wide, and at least 5 times as wide as it is thick.

In one advantageous embodiment, the rotary resonator 10 comprises at least one flexible guide to provide the pivoting and elastic return of at least one inertial element 3 with respect to the central mobile component 1.

This flexible guide may be produced in various ways: flexible blades or necked blades, arranged so that they intersect in a plane, or in planes that are parallel but intersect in projection onto one of these parallel planes, or alternatively arranged in an RCC (Remote Centre Compliance) configuration, which means to say with an offset centre of rotation, the blades together forming a vee, or other configuration.

The use of such flexible guides to perform the function of rotary guidance and elastic return makes it possible to eliminate the friction inherent in a traditional pivot of the shaft-bearing or similar type.

According to the embodiment, these flexible guides may be either attached to the central mobile component 1 and/or to an inertial element 3, or of one piece with at least one of the two, or both. The one-piece embodiments may be made from a micro-machineable material worked using a "Liga" or "Mems" or similar process, made from an at least partially amorphous material, of silicon and silicon oxide, of "DLC" (diamond like carbon) or the like.

More particularly, this flexible guide is a pivot with blades which are either intersecting coplanar, or intersecting in projection onto a plane of projection perpendicular to the central axis A, as in the embodiment of FIG. 4. This configuration offers the advantage of guaranteeing excellent running performance.

It is advantageous for the overall centre of mass to remain fixed, and for the combined effect of any unwanted shifting of the individual centres of mass of the inertial elements as they pivot to cancel one another out. What that means to say is that the overall centre of mass of the entire rotary resonator 10 remains fixed, irrespective of the amplitude. This can be obtained notably by the combination of the rotational geometric symmetry and the choice of flexible guides that are identical for the entire rotary resonator 10: each inertial element 3 of which it is composed is returned by the same flexible guide.

The use of intersecting blades, in particular geometries, makes it further possible to ensure that the return torque imposed by the flexible guide on each of the inertial elements is proportional to the sine of twice the angle of pivoting of this inertial element 3.

Two particular entirely nonlimiting arrangements are described hereinafter in order to explain the ways of achieving this.

FIG. 5 shows an asymmetric crossed-blades pivot: this flexible guide is designed to impart to the inertial element 3 a return torque that is proportional to the sine of twice the angle of pivoting of the said inertial element 3. This flexible guide comprises two asymmetric flexible blades 31, 32 each joining a first in-built restraint 41, 42 of the central mobile component 1 to a second in-built restraint 51, 52 of the inertial element 3. These first in-built restraints 41, 42 define with the second respective in-built restraints 51, 52, two main blade directions DL1, DL2. The central mobile component 1 and the inertial element 3 each are more rigid than each of the flexible blades 31, 32. The two main blade directions DL1, DL2 define a theoretical axis of pivoting D where they intersect when the two flexible blades 31, 32 are coplanar, or where their projections onto the plane of projection intersect when the two flexible blades 31, 32 extend on two levels parallel to the plane of projection but are not coplanar, as in the case of FIG. 4, and with a vertex angle $\alpha$ equal to 112.5°. The second 32 of these blades has, between its opposite in-built restraints, a second total length L2 that is triple the first total length L1 of the first 31 of the blades. Further, the distances between the first in-built restraints 41, 42 and the theoretical axis of pivoting D are, for the second blade 32 a second axial distance D2 equal to 0.875 times the second total length L2 and, for the first blade 31 a first axial distance D1 equal to 0.175 times the first total length L1.

Figure 6:
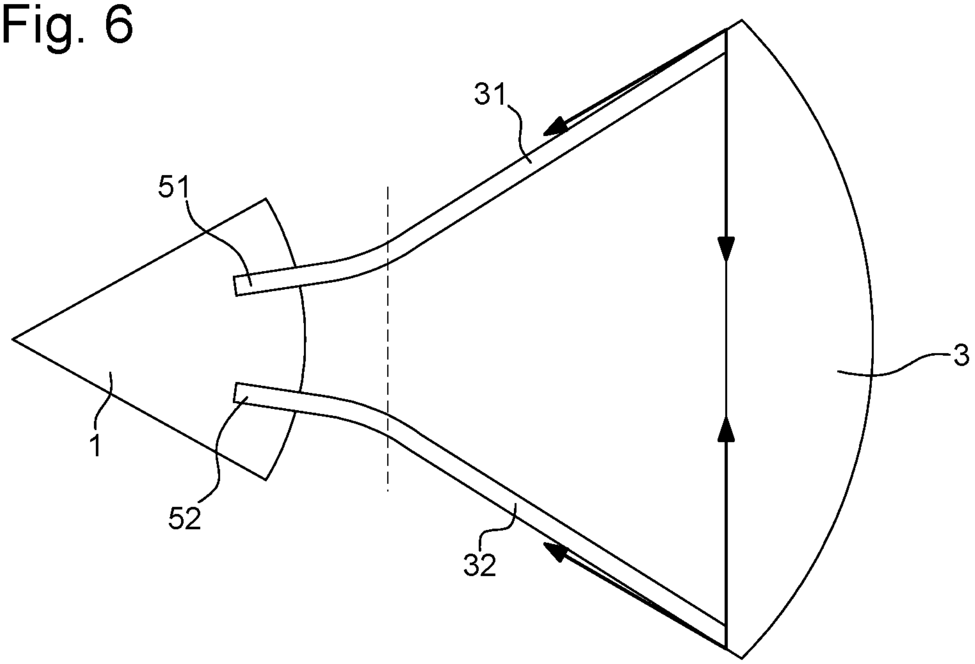
FIG. 6 is a view in planar projection of a second arrangement comprising two blades forming an RCC pivot with offset centre of rotation, in a particular arrangement designed likewise to create a return torque proportional to the sine of twice the angle of pivoting.

FIG. 6 shows an RCC configuration, with an offset centre of rotation, which is not produced in the one-piece form, but in a form in which the blades are angularly stressed by a small angle, in the vicinity of at least one of their ends, for example by the introduction of a slot which is offset laterally with respect to the theoretical blade direction. The flexible guide produced by this special RCC pivot thus makes it possible to create a torque proportional to the sine of twice the angle, the said flexible guide is produced by a remote centre compliance bladed pivot constituting a virtual pivot, in which the insetting of the blades 31, 32 into housings 51, 52 that the said central mobile component 1 and/or the said inertial element 3 comprises results from an angular preload of 0.15 radian, with torsion at the in-built restraint, the vertex angle formed by the directions of insetting of the said blades 31, 32 at the said virtual pivot is 52.642°, and the distance between the said virtual pivot and the closest in-built restraint is equal to 0.268864 times the length of each of the said blades 31, 32, which in this case are identical, between their in-built restraints in the unloaded state prior to the preloading of their end.

More particularly, this flexible guide is thermally compensated.

More particularly still, this flexible guide comprises blades made of oxidized silicon, on which a differential growth of silicon dioxide during a heat treatment allows elements of smaller cross section, such as blades within a one-piece assembly, to be highly prestressed.

In the alternative form of FIG. 1, the rotary resonator 10 comprises, articulated to some of the inertial elements 3, additional dynamic linkage elements 5 which, with these inertial elements 3, constitute an articulated structure of the pantograph type and which are designed to increase the radial deployment of the said rotary resonator 10 by limiting its height along the central axis A.

Figure 7:
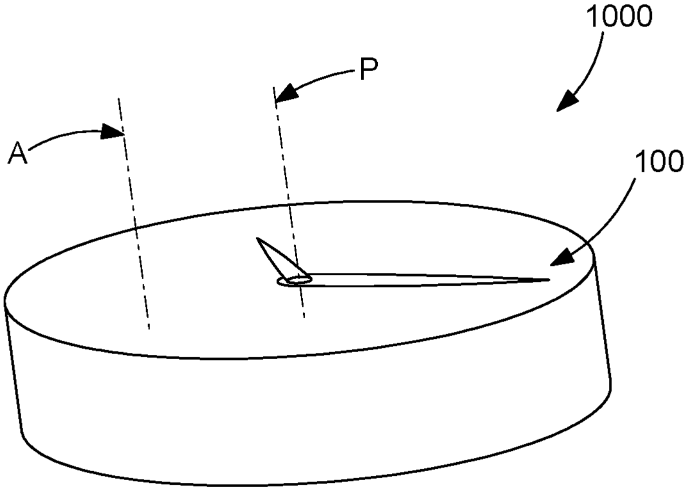
FIG. 7 is a schematic and perspective depiction of a movement comprising such a rotary resonator, with a central axis parallel to the main display axis of the movement.

In the alternative form of FIG. 7, the movement 100 comprises at least one main display axis P for displaying using hands or discs, and the central axis A is parallel to this main axis P.

Figure 8:
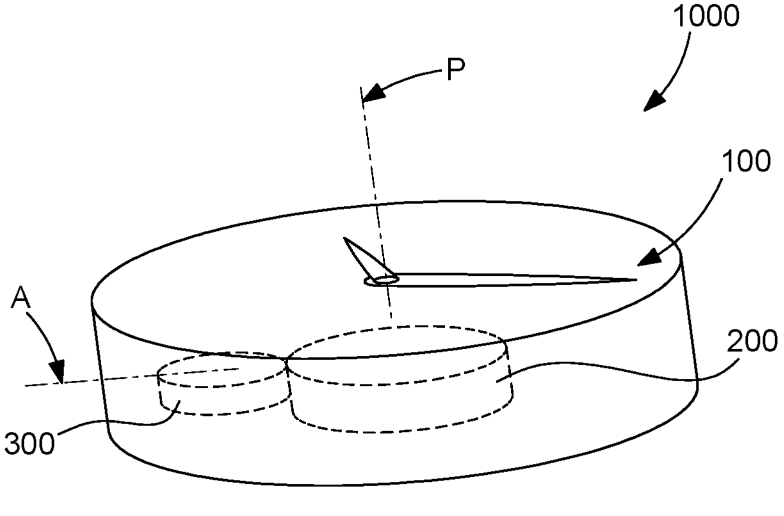
FIG. 8 is a schematic perspective depiction of a movement comprising such a rotary resonator, of central axis perpendicular to the main display axis of the movement.

In the alternative form of FIG. 8, the central axis A is this time perpendicular to the main axis P.

For example, the output mobile component of the gear train 300 is a worm designed to collaborate with a gearwheel which constitutes the input mobile component 2.

In particular, the rotary resonator 10 comprises just two or three inertial elements 3. Specifically, a compromise needs to be reached between performance and bulk, and a resonator having two inertial elements exhibiting rotational symmetry achieves the required performance.

In an advantageous alternative form of embodiment, the pivoting of the central mobile component 1 takes place on at least one magnetic pivot, so as to obtain the best efficiency.

The invention also relates to a mechanical watch 1000 comprising at least one such movement.

The present invention offers significant advantages:

it eliminates the friction work of the pivots of a conventional hair spring-balance, in order to increase the quality factor of the resonator;

it eliminates jerkiness of the escapement so as to increase the efficiency of the escapement;

it increases the run reserve of present-day mechanical watches;

it increases the precision of present-day mechanical watches.

For a given size of movement, the autonomy of the watch can be expected to be quintupled, and the regulating power of the watch can expect to be doubled. This amounts to stating that the invention allows a 10-fold improvement on movement performance.

What is claimed is:

1. A mechanical horological movement comprising:

at least one energy storage means configured to drive a gear train including an output mobile component that is configured to pivot about a drive axis and comprising a rotary resonator that comprises at least one central mobile component configured to pivot about a central axis and comprising an input mobile component designed to collaborate with the output mobile component, wherein the rotary resonator comprises at least one inertial element configured to pivot with respect to the central mobile component about a secondary axis perpendicular to the central axis, and returned towards a rest position, relative with respect to the said central mobile component, by at least one elastic return element, and wherein the secondary axis passes through the centre of mass of the inertial element associated with the secondary axis.

2. The movement according to claim 1, wherein the rotary resonator comprises a plurality of the inertial element each one configured to pivot with respect to the central mobile component about the secondary axis perpendicular to the central axis, and each one returned towards a rest position, relative with respect to the central mobile component, by the at least one elastic return element, and further wherein each said secondary axis passes through the centre of mass of the inertial element associated with the secondary axis.

3. The movement according to claim 1, wherein the at least one elastic return element is configured to apply to the inertial element a torque with an elastic return moment, according to the relationship:

$$M(\theta_1)=\tfrac{1}{2}\cdot\omega_3^2\cdot(I_2-I_3)\cdot\sin(2\theta_1),$$

where $\theta_1$ is the angle of inclination of the inertial element with respect to its said rest position, rest position being a position of equilibrium of the inertial element when stationary, where $\omega_3$ is the angular velocity of the central mobile component, where $I_2$ is the inertia of the inertial element with respect to a transverse axis perpendicular both to the central axis and to the secondary axis and where $I_3$ is the inertia of the inertial element with respect to the central axis.

4. The movement according to claim 1, wherein the rotary resonator exhibits, in a rest position, rotational symmetry about the central axis of an order that is greater than or equal to 2.

5. The movement according to claim 2, wherein the inertial elements that the rotary resonator comprises have, in a rest position, rotational symmetry about the central axis of an order that is greater than or equal to 2.

6. The movement according to claim 1, wherein at least one said inertial element exhibits rotational symmetry of an order equal to 2 about its said secondary axis.

7. The movement according to claim 6, wherein each said inertial element exhibits rotational symmetry of an order equal to 2 about its said secondary axis.

8. The movement according to claim 1, wherein at least one said elastic return element is fixed at a first end to the central mobile component and at a second end to the inertial element.

9. The movement according to claim 1, wherein at least one said elastic return element is fixed at a first end to one said inertial element and at a second end to another said inertial element.

10. The movement according to claim 8, wherein each said elastic return element is fixed at a first end to the central mobile component and at a second end to the inertial element.

11. The movement according to claim 1, wherein all the inertial elements are configured to pivot about a common secondary axis.

12. The movement according to claim 1, wherein at least one said inertial element is at least 5 times as long as it is wide, and at least 5 times as wide as it is thick.

13. The movement according to claim 1, wherein the rotary resonator comprises at least one flexible guide to provide the pivoting and elastic return of at least one said inertial element with respect to the said central mobile component.

14. The movement according to claim 13, wherein the flexible guide is a pivot with blades that are either intersecting coplanar, or intersecting in projection onto a plane of projection perpendicular to the central axis or with an offset centre of rotation.

15. The movement according to claim 13, wherein the flexible guide is configured to impart to the inertial element a return torque that is proportional to the sine of twice the angle of pivoting of the inertial element.

16. The movement according to claim 13, wherein the flexible guide is produced by a bladed pivot with an offset center of rotation constituting a virtual pivot, in the virtual pivot the insetting of the blades into housings that the central mobile component or the inertial element comprises results from an angular preload of 0.15 radian, wherein the vertex angle formed by the directions of insetting of the blades at the virtual pivot is 52.642°, and wherein the distance between the virtual pivot and the closest in-built restraint is equal to 0.268864 times the length of each of the blades between their in-built restraints in the unloaded state prior to the preloading of their end.

17. The movement according to claim 13, wherein the flexible guide is thermally compensated and comprises blades made of oxidized silicon.

18. The movement according to claim 1, wherein the rotary resonator comprises, articulated to some of the inertial elements, additional dynamic linkage elements that, with the inertial elements, constitute a structure of the pantograph type and are configured to increase the radial deployment of the rotary resonator by limiting its height along the central axis.

19. The movement according to claim 1, wherein the movement comprises at least one main display axis for displaying using hands or discs, and wherein the central axis is parallel to the main axis.

20. The movement according to claim 1, wherein the movement comprises at least one main display axis for displaying using hands or discs, and wherein the central axis is perpendicular to the main axis.

21. The movement according to claim 1, wherein the output mobile component of the gear train is a worm.

22. The movement according to claim 1, wherein the rotary resonator comprises just two or three inertial elements.

23. The movement according to claim 1, wherein the pivoting of the central mobile component takes place on at least one magnetic pivot.

24. A mechanical watch comprising at least one movement according to claim 1.

* * * * *